United States Patent [19]

Blasse et al.

[11] 3,723,787
[45] Mar. 27, 1973

[54] RED LUMINESCENT EUROPIUM ACTIVATED YTTRIUM OXYCHLORIDE PHOSPHOR AND COLOR TELEVISION DISPLAY TUBES CONTAINING SAID PHOSPHOR

[75] Inventors: George Blasse; Jaap De Vries, both of Emmasingel, Eindhoven, Netherlands

[73] Assignee: U.S. Philips Corporation, New York, N.Y.

[22] Filed: Mar. 6, 1970

[21] Appl. No.: 17,013

Related U.S. Application Data

[63] Continuation of Ser. No. 654,652, July 19, 1967, abandoned.

[52] U.S. Cl. .......................313/92 PH, 252/301.4 H
[51] Int. Cl. .......................C09k 1/08, H01j 29/20
[58] Field of Search .......................252/301.4; 313/92

[56] References Cited

UNITED STATES PATENTS

| | | | |
|---|---|---|---|
| 2,729,605 | 1/1956 | Swindells | 252/301.4 |
| 3,415,757 | 12/1968 | Wanmaker et al. | 252/301.4 |

OTHER PUBLICATIONS

Kroger–Luminescence of Solids 1948 pages 52, 291, 292, 294, 295, & 296

*Primary Examiner*—Robert D. Edmonds
*Attorney*—Frank R. Trifari

[57] ABSTRACT

Europium activated red luminescing phosphor for color television, said phosphor being a trivalent europium activated oxychloride of an element such as a rare earth metal such as yttrium, lanthanum and gadolinium.

3 Claims, 1 Drawing Figure

PATENTED MAR 27 1973
3,723,787
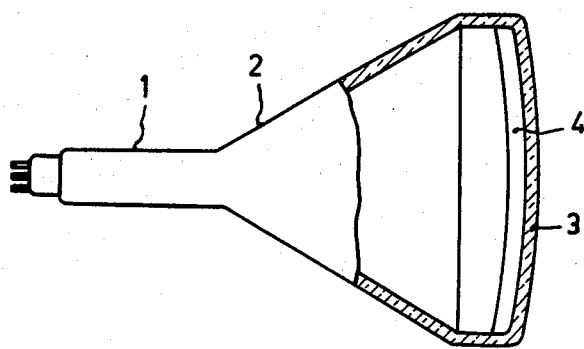
INVENTOR.
GEORGE BLASSE
JAAP DE VRIES
BY
AGENT

RED LUMINESCENT EUROPIUM ACTIVATED YTTRIUM OXYCHLORIDE PHOSPHOR AND COLOR TELEVISION DISPLAY TUBES CONTAINING SAID PHOSPHOR

This application is a continuation of our copending United States patent application Ser. No. 654,652, filed July 19, 1967 and now abandoned.

The invention in this case relates to a novel red luminescing phosphor and to a color television display tube provided with a luminescent screen which contains this red phosphor.

Until a few years ago, color television display tubes nearly always employed a luminescent screen the red luminescing component of which consisted of a silver-activated sulphide of zinc and cadmium. Since a few years, this situation has changed owing to the discovery that many compounds activated with trivalent europium, particularly compounds of rare earth metals, show a red luminescence upon excitation by electrons. A few of these compounds, for example, yttrium vanadate, gadolinium oxide and yttrium oxide, are more suitable for displaying color television pictures than the sulphides. These compounds generally have a higher lumen equivalent than the sulphides upon excitation by electrons. Since the emission is moreover concentrated in a narrow wavelength range, a more natural reproduction of deep-red colors can thus be obtained and the brightness of the entire color television picture can be increased.

However, besides their favorable properties, these substances also have a few unfavorable properties. For example, it is very difficult to obtain yttrium vanadate of a purely white color. Due to the presence of non-converted vanadium oxide, the conventional methods of preparation nearly always yield a gray colored powder. Although an improvement may be obtained in this respect by washing the gray powder with a lye, for example, caustic soda, the color of the washed substance becomes light-yellow. This light-yellow color is very disadvantageous in color television display tubes, since it may give rise to a color shift when the screen is struck by incident white light. Thus the yellow vanadate reflects the yellow radiation from the white light, so that the spectator observes a color that is a mixture of this yellow reflected light and the red luminescent light originating from the vanadate. Of course, this phenomenon is very disturbing. Further, the additional process of washing with the lye renders the phosphors more expensive.

Also the oxides of yttrium and gadolinium cause difficulties in the manufacture of the luminescent screens for color television display tubes. As they are soluble in water and diluted acids, an excess of said substances, which is not left on the luminescent screen, can be recovered only with great difficulty. However, this recovery is very desirable, since these substances are very expensive, in contradistinction to sulphides.

A further disadvantage of the suspensions of europium-activated gadolinium oxide or yttrium oxide is that they produce an alkaline reaction, which has a disturbing effect during the application of these substances to the display screen, since in such process, use is frequently made of a photochemically hardening binder containing ammonium bichromate. Due to the alkaline reaction of the suspension, this bichromate is readily converted into chromate which does not produce the reaction desired for the hardening process.

According to our invention we have prepared a novel europium activated phosphor wherein the above-stated disadvantages are substantially completely obviated.

More particularly according to our invention we have prepared a novel europium activated red luminescing phosphor of the formula $Me_{(1-x)}Eu_x^{+++}OCl$, in which formula Me represents at least one of the elements of the group comprising yttrium, lanthanum and gadolinium and x has a value of $10^{-3} \leq x \leq 0.15$. According to another aspect of our invention we have provided a color television display tube containing as the red luminescing component the novel europium activated phosphor of our invention.

The europium content is chosen so that $10^{-3} \leq x \leq 0.15$. For within these limites, the efficiency is very high. The maximum efficiency is obtained at values of x lying between 0.01 and 0.06.

Upon excitation by electrons, the europium activated phosphors of our invention exhibit an emission which is as red as that of the yttrium vanadate and redder than that of the gadolinium oxide.

Further the phosphors of our invention have a white color, do not produce in suspension an alkaline reaction and are not soluble in water and diluted acids.

The preparation of the phosphors according to the invention is simple. A particular advantage is that the heat treatment, which is always required for all phosphors, can be carried out at a low temperature, i.e., at a temperature lying between 300° C and 700° C.

Upon excitation by electrons, gadolinium oxychloride and yttrium oxychloride have an energy efficiency of 4 percent and 3 percent, respectively. The efficiency of lanthanum oxychloride is slightly lower, i.e., approximately 2 percent.

Our invention will now be described in greater detail with reference to the Drawing and example.

In the Drawing the sole FIGURE shows, partly in section, a cathode-ray tube employing a red luminescent component of our invention. The tube consists of a cylindrical part 1 and a frusticonical part 2. The part 2 is closed at one end with a face plate 3 of glass which is covered on its interior side with a luminescent screen 4. This screen consists of an array of regulary placed dots which emit, upon electronic excitation, one of the colors green, blue or red. The red luminescing dots consist of a europium-activated yttrium oxychloride of our invention.

The luminescing dots may be bound to the glass plate by means of a binder for example polyvinyl alcohol hardened by ultraviolet radiation.

EXAMPLE 21.5 g of $Y_2O_3$ and 1.8 g of $Eu_2O_3$ are dissolved in concentrated hydrochloric acid and the compound $Y_{0.95}Eu_{0.05}Cl_3 \cdot 6H_2O$ is caused to crystallize from this solution by heating. This compound is then heated for 6 hours in a current of oxygen at a temperature of 600° C. The compound is thus converted into the oxychloride having the formula $Y_{0.85}Eu_{0.05}OCl$. This compound is immediately suitable to be applied to the luminescent screen of a color television display tube by means of the usual methods.

Instead of causing the water-containing chloride to crystallize from the solution in the concentrated hydrochloric acid, the solution may be evaporated to dryness. The same compound is then obtained.

The oxychlorides of lanthanum or gadolinium may be prepared in a quite analogous manner, but of course the different atomic weights of the elements must then be taken into account. It is also possible to prepare oxychlorides of two or more of the said elements, since they readily form mixed crystals.

What is claimed is:

1. A red luminescing europium activated oxychloride phosphor of the formula $$[Me]Y_{(1-x)}Eu_x^{+++}OCl$$

wherein x has a value $$10^{-3} \leq x \leq 0.15.$$

2. The red luminescing phosphor of claim 1 wherein $0.01 \leq x \leq 0.06$.

3. A color television display tube containing as the red luminescing phosphor a red luminescent phosphor of claim 1.

* * * * *